United States Patent [19]
Grochowski et al.

[11] Patent Number: 5,696,935
[45] Date of Patent: Dec. 9, 1997

[54] MULTIPORTED CACHE AND SYSTEMS

[75] Inventors: Edward T. Grochowski, San Jose; Mustafiz R. Choudhury, Sunnyvale, both of Calif.

[73] Assignee: Intel Corporation, Santa Clara, Calif.

[21] Appl. No.: 914,877

[22] Filed: Jul. 16, 1992

[51] Int. Cl.$^6$ ........................ G06F 12/08
[52] U.S. Cl. .............. 395/452; 395/458; 395/467; 395/455; 395/453; 395/472; 365/230.05
[58] Field of Search .................. 395/425, 458, 395/452, 467, 455, 453, 473; 364/244.8, 231.8, 965.9, 948.34, 964.31, 964.26; 365/49, 230.05

[56] References Cited

U.S. PATENT DOCUMENTS

| | | | |
|---|---|---|---|
| 4,782,441 | 11/1988 | Inagami et al. | 395/800 |
| 5,056,002 | 10/1991 | Watanabe | 395/446 |
| 5,163,140 | 11/1992 | Stiles et al. | 395/467 |
| 5,228,135 | 7/1993 | Ikumi | 395/458 |
| 5,274,790 | 12/1993 | Suzuki | 395/460 |

*Primary Examiner*—Eddie P. Chan
*Assistant Examiner*—R. G. Bragdon
*Attorney, Agent, or Firm*—Blakely, Sokoloff, Taylor & Zafman

[57] ABSTRACT

A cache memory is provided with a plurality of address ports and a corresponding plurality of tag ports for use with multiple pipes in a pipelined system. One of the address ports is dedicated to snooping and the remaining address ports provide concurrent access to the cache for references to one or more independent addresses respectively issued by one or more pipes. A tag port is provided for each of the address ports to provide concurrent hit/miss status for each address.

8 Claims, 2 Drawing Sheets

5,696,935

MULTIPORTED CACHE AND SYSTEMS

FIELD OF THE INVENTION

The present invention relates to the field of microprocessor architecture, and in particular to a cache memory having multiple address ports and corresponding multiple tag ports.

BACKGROUND OF THE INVENTION

Microprocessor systems widely employ cache memories, both for storing data and for storing program instructions. As is well-known, the operating speed of a microprocessor system is enhanced by the use of data and/or instruction caches since the access time for the cache memory, typically implemented with high-speed SRAMs is much less than for the system's main memory, typically implemented with DRAMs. Still greater improvement is afforded by incorporating cache memories on the microprocessor chip itself.

In a multiprocessor environment, there is a need to maintain cache coherency. That is, the system must insure that data or instructions modified in a cache of one processor are not used in another processor in unmodified form. In order to prevent this from occurring, it is conventional to "snoop" in each cache to determine if a particular line is present when such line is being modified. If the line is found, the state of that cache line is modified in accordance with a cache coherency protocol implemented by the system.

Prior art caches are single ported so that any one cache cycle is devoted either to snooping or to a processor supported cycle. Snooping therefore generally exacts a performance penalty since some percentage of cache cycles must be dedicated to the snoop function. This reduces the effective access time for the cache and degrades overall system performance.

The present invention addresses this particular problem by providing a cache in which snooping for one address can be conducted concurrently with one or more references to different addresses in a single clock.

SUMMARY OF THE INVENTION

The present invention provides a cache memory having a plurality of address ports and a corresponding plurality of tag ports. One of the address ports is dedicated to snooping and the remaining address ports provide concurrent access to the cache for references to one or more independent addresses. A tag port is provided for each of the address ports to provide concurrent hit/miss status for each address.

In an exemplary embodiment, a data cache has a snoop address port and two additional address ports associated with two independent instruction pipelines. An instruction cache has a dedicated snoop address port and two additional address ports to facilitate access to two different cache lines in the same clock cycle. In each cache, the tags are triple ported.

DETAILED DESCRIPTION OF THE INVENTION

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

The invention described herein is embodied in a microprocessor hereinafter referred to as the P5 microprocessor which is manufactured by Intel Corporation, the assignee of this application. The P5 is a superscalar microprocessor of degree two having dual instruction pipelines and is generally an improved version of Intel's popular Intel 486™ microprocessor. Details of the architecture and instruction set of the Intel 486™ microprocessor are described in numerous publications widely disseminated to those in the art. (Intel and 486 are trademarks of Intel Corporation.) Although frequent reference will be made to the P5 architecture in the specification, and examples will be provided in the context of instructions used by Intel's family of microprocessors, including the Intel 486™, it is to be understood that the present invention is not limited to these specific machines.

The functional unit of the P5 that includes the data cache is referred to as the K-unit. The K-unit can support a continuous rate of two data references per clock, one each from two integer pipelines, referred to as the u-pipe and the v-pipe. The K-unit is also responsible for detecting address collisions between requests in the two pipelines (e.g., concurrent u-pipe memory write and v-pipe memory read to the same location) and serializing those requested accesses.

Figure 4:
FIG. 4 is illustrative of a cache line.

The P5 implements a high performance data cache on chip with full support for multiprocessing consistency. The data cache can store 8 Kbytes of data. It is a two-way set associative cache organized as 128 sets, each set containing 2 lines. Each line contains 32 bytes of data. A 24 bit triple ported tag and two bits of triple ported status information are also associated with each line. The data array is single ported. Each cache line is physically organized as 8 banks of 4 consecutive bytes (see, for example FIG 4). This allows two simultaneous accesses to different banks in different lines with independent addresses from the u and v pipelines. The data cache is a write back cache with full support for multiprocessing data consistency. It can optionally be configured in write through mode on a line by line basis.

A cache consistency protocol insures that there is a coherency between the data and code caches, and further that there is coherency among the caches of all processors in a multiprocessor environment.

Figure 1:
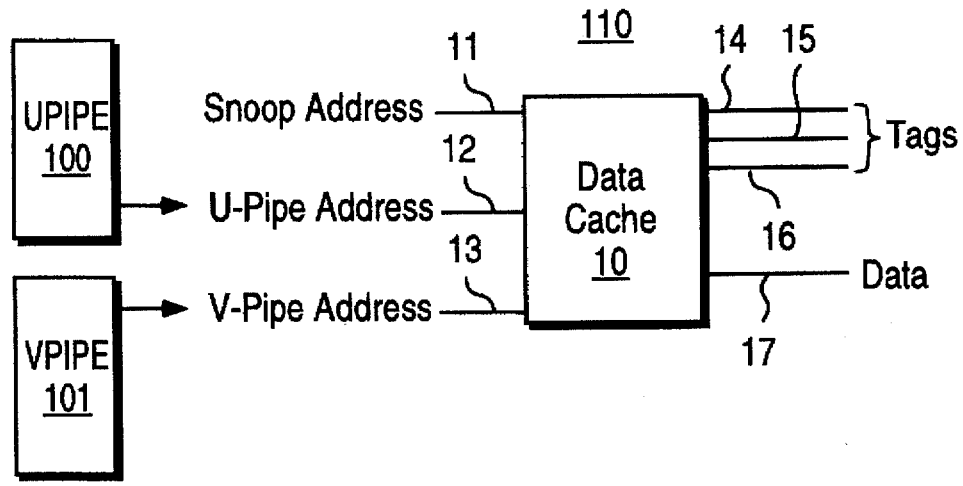
FIG. 1 schematically illustrates a data cache of the present invention.

The porting of the data cache is illustrated in FIG. 1. Microprocessor 110 includes two pipelines, U pipe 100 and V pipe 101. Data cache 10 has three address ports 11, 12 and 13. These are dedicated to snooping, the u-pipe 100 and the v-pipe 101, respectively. Of course, the same concept would accommodate additional address ports as might be required, for example, in the case of a microprocessor having more than two instruction pipelines. Tag ports 14, 15 and 16 are associated with the three address ports 11, 12 and 13, respectively. Data cache 10 is provided with a single data port 17.

The K-unit can run various types of cycles through the data cache, one of which is an "inquire" cycle. The purpose of an inquire cycle (snooping) is to check whether the address being presented is contained within the caches in the P5. Snooping is performed to maintain cache coherency both among the various processors in a multiprocessing environment as well as among the various caches within a single processor. An inquire cycle is run through the data cache, and also the code cache as will be described below, through the dedicated snoop port to determine if the address is in the cache. If the address is not in the P5 cache, no action need be taken and there is no performance penalty since the snoop was conducted concurrently with activity on the other address ports. If the snooped address is in the P5 cache, an external pin (HIT#) is asserted. If the address hits a modified line in the data cache, an additional external pin (HITM#) is also asserted and the modified line is pushed out of the cache. Since snooping is a read only function, there is a one clock penalty if the cache contents must be changed.

Figure 2:
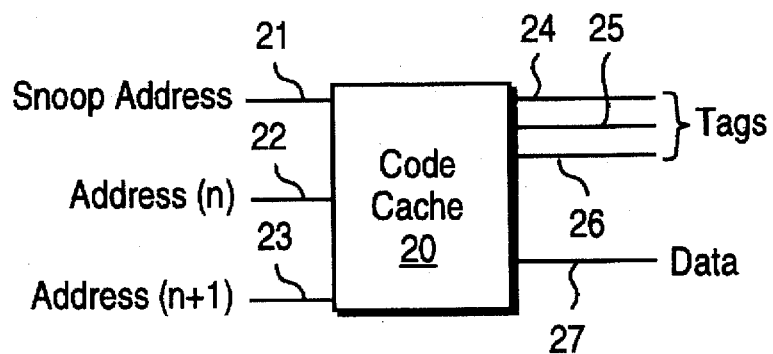
FIG. 2 schematically illustrates a code cache of the present invention.

The instruction or code cache of the P5 holds 8 Kbytes of instructions and is organized as a two-way set associative cache with 128 sets. Each cache line holds 32 bytes of optcodes, 32 end bit markers and two parity bits. The code cache is ported in a manner analogous to the data cache. Referring to FIG. 2, code cache 20 is shown with address ports 21, 22 and 23. Address port 21 is dedicated to snooping, whereas ports 22 and 23 accommodate split-line accesses in support of branch cycles to the upper half of a cache line. The code cache is capable of retrieving the upper half of that line and the lower half of the next line, all in the same clock. As in the case of data cache 10, the tags of code cache 20 are triple ported at ports 24, 25 and 26. A single data port 27 feeds requested cache lines containing raw instruction opcodes to the P5 instruction decoder.

Figure 3:
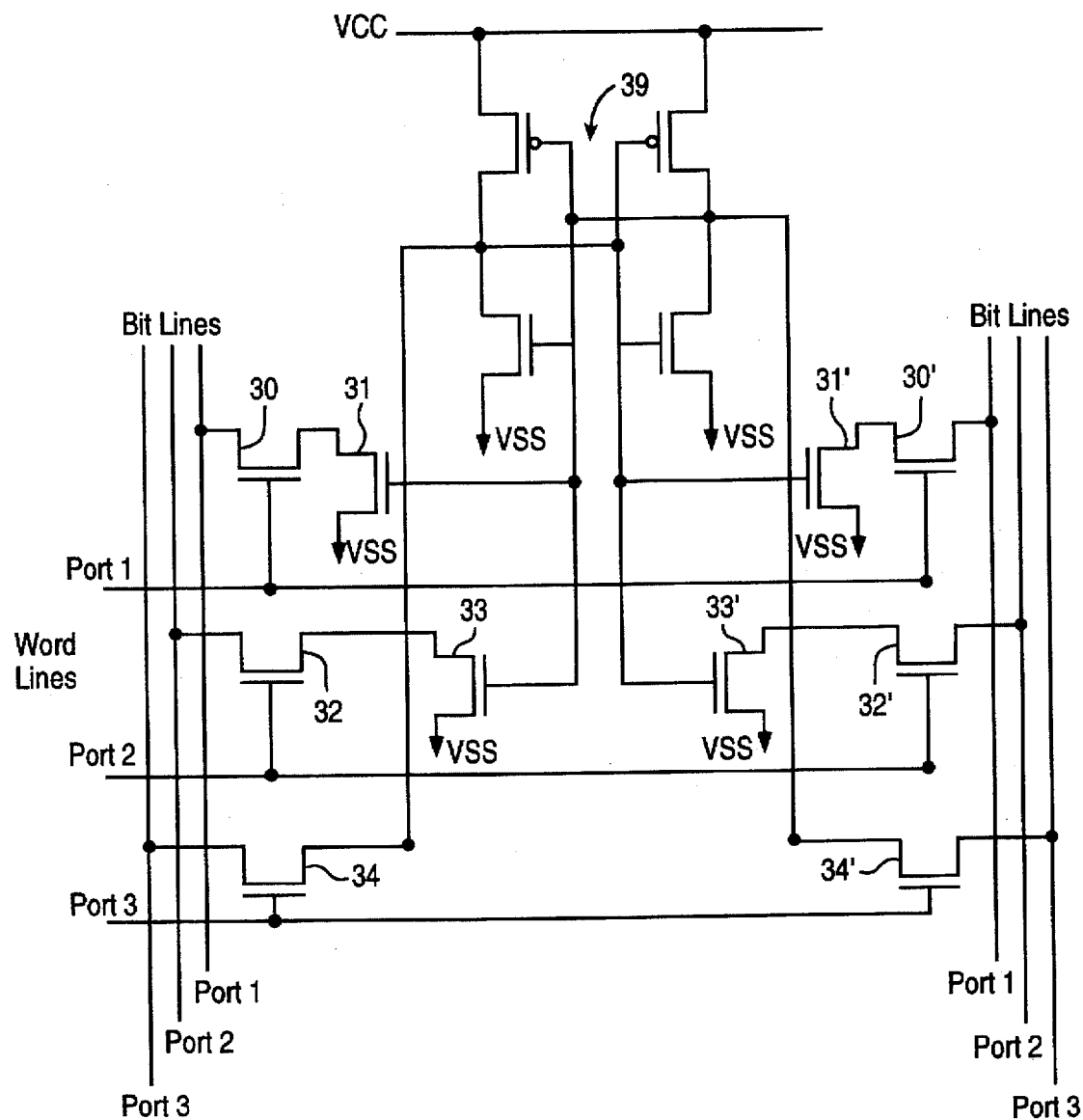
FIG. 3 is a schematic diagram of a circuit for implementing the present invention.

FIG. 3 illustrates triple tag porting of a single tag RAM cell as implemented in both the data and instruction caches. A single tag bit flip flop is shown at 39. Word lines for the three independent address ports are coupled to the gate terminals of respective transistors 30, 30', 32, 32', 34 and 34'. The state of flip flop 39 is thus selectively gated onto the bit lines and complementary bit lines associated with each port. As illustrated in FIG. 3, ports 1 and 2 are read only and port 3 is a read-write port.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

We claim:

1. A microprocessor system comprising:

a first pipeline for execution of instructions;

a second pipeline for execution of instructions;

a cache comprising a plurality of bits of information organized into lines, each line having an associated tag and a plurality of associated memory location addresses identifying associated memory locations on each line of the cache, said cache comprising a first address port coupled to the first pipeline for receiving first memory location addresses and a second address port coupled to the second pipeline for concurrently receiving second memory location addresses, and first and second tag ports respectively coupled to the first and second pipelines and associated with the first and second address ports for concurrently receiving tag data to the cache corresponding respectively to the first and second memory location addresses, and a single data port coupled to the first and second pipelines for providing data located at the memory location addresses provided at the first and second address ports.

2. The microprocessor as set forth in claim 1, said cache further comprising a third address port coupled to the first pipeline for receiving a snoop memory location address and third tag port coupled to the first and second pipelines for concurrently receiving tag data corresponding respectively to the snoop memory location address, for providing snooping by either the first pipeline or second pipeline.

3. The memory cache as set forth in claim 1, wherein said cache is a data cache.

4. The microprocessor as set forth in claim 1, wherein the bandwidth of the single data port is sufficient to accommodate a plurality of predetermined sized banks, each line comprising a plurality of said plurality of banks and the location of banks identified respectively by the memory location addresses received at the first and second address ports.

5. The microprocessor as set forth in claim 4, wherein each line comprises 32 bytes and each bank of the plurality of banks comprises 4 bytes.

6. The microprocessor as set forth in claim 4, wherein said cache is an instruction cache comprising a plurality of instructions, wherein if a branch instruction is executed by the first pipeline causing a first memory location address to be input to the first address port and the second pipeline provides a second memory location address to be input to the second address port, said first memory location address identifying a last bank of a first cache line and the second memory location address identifying a first bank in a second cache line, said memory cache providing data stored in said first and last banks concurrently to the data port.

7. An instruction cache for processing branch instructions comprising:

a plurality of lines of the cache, each line comprising a plurality of banks of data, each line having an associated tag and each bank identified by an associated memory location address;

first and second address ports for concurrently providing a first memory location address and second memory location address;

first and second tag ports respectively associated with the first and second address ports for concurrently providing tag data to the cache corresponding respectively to the first and second memory location addresses; and a single data port for providing data located at the memory location addresses provided at the first and second address ports, the bandwidth of the single data port being sufficient to accommodate a plurality of predetermined sized banks, a location of each of said plurality of banks provided to the single data port identified by the memory location address and second memory location address respectively provided at the first and second address ports; wherein if a branch instruction is executed causing a first memory location address to be input to the first address port and a second memory location address to be input to the second address port, said first memory location address identifying a last bank of a first cache line and the second memory location address identifying a first bank in a second cache line, said cache providing data of said first and second banks concurrently to the data port.

8. The memory cache as set forth in claim 7 wherein each line comprises 32 bytes and each bank comprises 4 bytes.

* * * * *